(12) United States Patent
Ayachitula et al.

(10) Patent No.: US 9,069,969 B2
(45) Date of Patent: Jun. 30, 2015

(54) MANAGING SOFTWARE PATCH INSTALLATIONS

(75) Inventors: Naga A. Ayachitula, Elmsford, NY (US); William A. Lemke, Scarsdale, NY (US); Rajeev Puri, Huntersville, NC (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/495,504

(22) Filed: Jun. 13, 2012

(65) Prior Publication Data

US 2013/0340074 A1 Dec. 19, 2013

(51) Int. Cl.
*G06F 21/00* (2013.01)
*G06F 21/57* (2013.01)
*H04L 29/06* (2006.01)
*G06F 21/55* (2013.01)

(52) U.S. Cl.
CPC .......... *G06F 21/577* (2013.01); *H04L 63/1441* (2013.01); *H04L 63/1433* (2013.01); *G06F 21/55* (2013.01)

(58) Field of Classification Search
CPC ... G06F 21/577; G06F 21/55; H04L 63/1441; H04L 63/1433
USPC ................................ 726/22, 23, 25; 713/188
See application file for complete search history.

(56) References Cited

U.S. PATENT DOCUMENTS

| | | | | |
|---|---|---|---|---|
| 6,047,129 | A * | 4/2000 | Frye .............................. | 717/172 |
| 7,937,697 | B2 | 5/2011 | Alberti et al. | |
| 8,239,915 | B1 * | 8/2012 | Satish et al. ....................... | 726/1 |
| 8,266,268 | B1 * | 9/2012 | Zang et al. ..................... | 709/223 |
| 8,495,747 | B1 * | 7/2013 | Nakawatase et al. ........... | 726/25 |
| 8,566,932 | B1 * | 10/2013 | Hotta et al. ...................... | 726/22 |
| 2004/0260947 | A1 * | 12/2004 | Brady et al. ..................... | 713/201 |
| 2005/0198099 | A1 * | 9/2005 | Motsinger et al. ............. | 709/200 |
| 2005/0198527 | A1 * | 9/2005 | Johnson et al. ................ | 713/200 |
| 2006/0031938 | A1 * | 2/2006 | Choi ................................ | 726/25 |
| 2006/0075001 | A1 * | 4/2006 | Canning et al. ................ | 707/203 |
| 2009/0183243 | A1 * | 7/2009 | Ruppert et al. ................... | 726/5 |
| 2010/0169874 | A1 | 7/2010 | Izard et al. | |
| 2010/0218176 | A1 * | 8/2010 | Spanner et al. ............... | 717/170 |
| 2011/0126187 | A1 | 5/2011 | Alberti et al. | |

(Continued)

OTHER PUBLICATIONS

P. Mell et al., "Creating a Patch and Vulnerability Management Program", National Institute of Standards and Technology—NIST, Special Publication 800-40, Version 2.0, Nov. 2005.
IBM, "Unified Device Management", IBM Corporation, Retrieved Jul. 25, 2014, pp. 1-2.

(Continued)

*Primary Examiner* — Sarah Su
(74) *Attorney, Agent, or Firm* — John R. Pivnichny; Law Office of Jim Boice

(57) ABSTRACT

A computer hardware-implemented method, system, and/or computer program product manages software patches. A computer monitoring hardware system receives a notification of a new release of a software patch. The computer monitoring hardware system scores a security posture of a monitored computer system to generate a security posture value based on a set of computer system parameters for the monitored computer system. In response to patch control logic within the computer monitoring hardware system determining that the monitored computer system is authorized to install the software patch and that the security posture value exceeds the predetermined value, the computer monitoring hardware system retrieves and installs the software patch in the monitored computer system.

19 Claims, 2 Drawing Sheets

(56) References Cited

U.S. PATENT DOCUMENTS

| | | | |
|---|---|---|---|
| 2011/0197253 A1* | 8/2011 | Tas | 726/1 |
| 2013/0014264 A1* | 1/2013 | Kennedy et al. | 726/25 |
| 2013/0055228 A1* | 2/2013 | Song et al. | 717/168 |
| 2013/0298244 A1* | 11/2013 | Kumar et al. | 726/25 |
| 2013/0332919 A1* | 12/2013 | Emejulu et al. | 717/174 |

OTHER PUBLICATIONS

Anonymous, "HP Openview", wikipedia.org, Last Modified Jul. 18, 2014, Retrieved Jul. 25, 2014, pp. 1-6.

M. Rouse, "Authorized Program Analysis Report (APAR)", Techtarget, techtarget.com, Oct. 2005, pp. 1-6.

\* cited by examiner

MANAGING SOFTWARE PATCH INSTALLATIONS

BACKGROUND

The present disclosure relates to the field of computers, and specifically to the use software patches for software running in computers. Still more particularly, the present disclosure relates to managing which software patches are installed in particular computers.

Once software is released, a determination is often made that a "fix" is needed to correct a fault in the software. This fault may have been inherent at the time of the release, or it may be in response to a new threat, such as a virus attack. Such "fixes" are referred to as "software patches," and are typically made available by the enterprise that released the software.

SUMMARY

A computer hardware-implemented method, system, and/or computer program product manages software patches. A computer monitoring hardware system receives a notification of a new release of a software patch. The computer monitoring hardware system scores a security posture of a monitored computer system to generate a security posture value based on a set of computer system parameters for the monitored computer system. In response to patch control logic within the computer monitoring hardware system determining that the monitored computer system is authorized to install the software patch and that the security posture value exceeds the predetermined value, the computer monitoring hardware system retrieves and installs the software patch in the monitored computer system.

DETAILED DESCRIPTION

Figure 1:
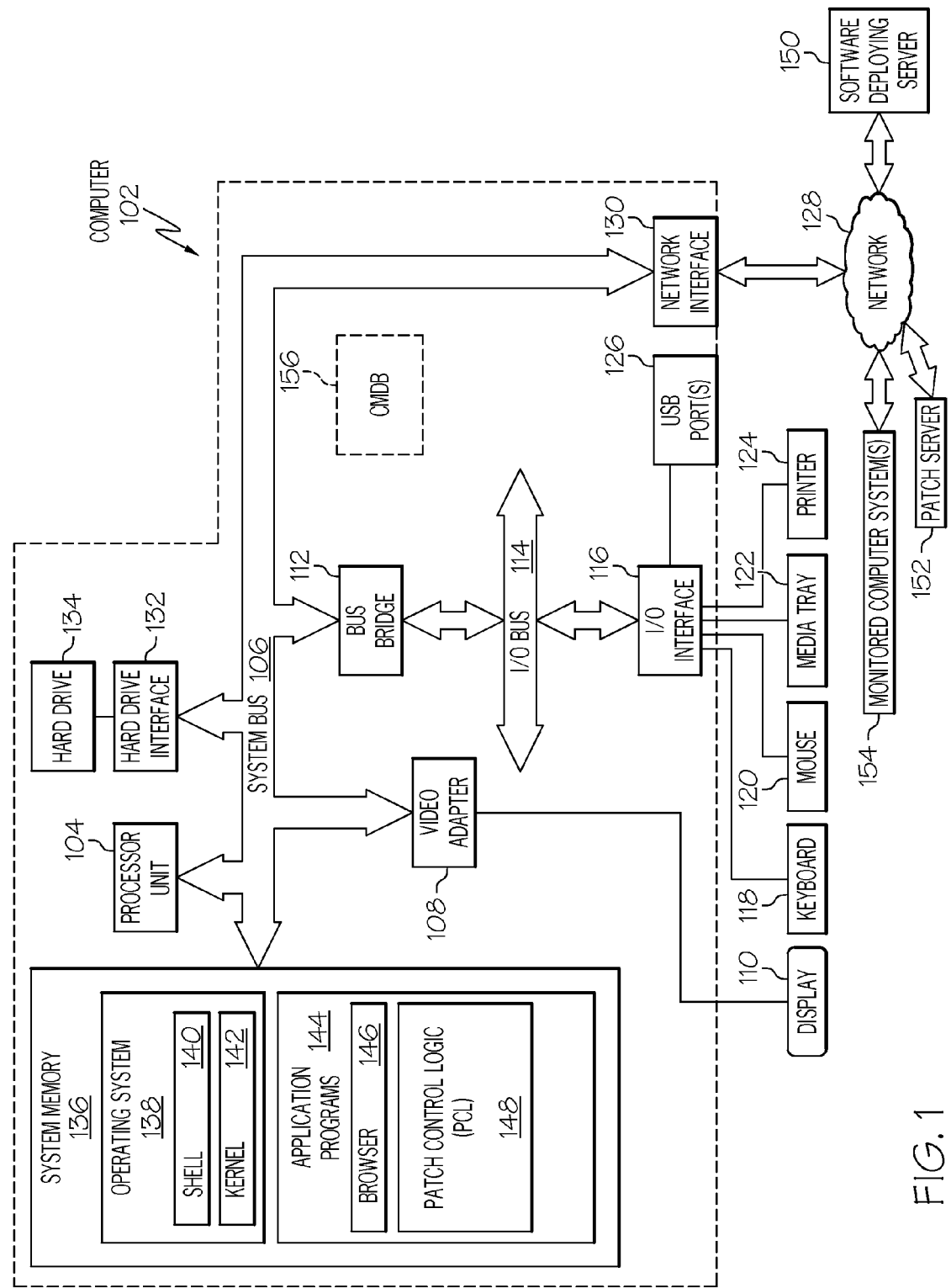
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As noted herein, a complex stream computer utilizes software and hardware components that interact with one another, such that a downstream component is reliant on an output from an upstream component in the complex stream computer. Thus, such systems are notoriously difficult to debug. That is, if the output of the entire stream computer fails, (i.e., if the output is an error code, is nonsense, is outside of an acceptable range, etc.), the upstream cause within the complex stream computer is difficult to identify by simply backtracking. The present invention presents a novel approach to identifying root causes in such cascade processes.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150, patch server 152, and/or monitored computer system(s) 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, as well as patch server 152 and/or monitored computer system(s) 154, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150, patch server 152, monitored computer system(s) 154, and other computer systems.

Application programs 144 in computer 102's system memory (as well as software deploying server 150's system memory) also include a patch control logic (PCL) 148. PCL 148 includes code for implementing the processes described below, including those described in FIG. 2. In one embodiment, computer 102 is able to download PCL 148 from software deploying server 150, including in an on-demand basis, wherein the code in PCL 148 is not downloaded until needed for execution. Note further that, in one embodiment of the present invention, software deploying server 150 performs all of the functions associated with the present invention (including execution of PCL 148), thus freeing computer 102 from having to use its own internal computing resources to execute PCL 148.

Patch server 152 provides notice of and/or delivery of software patches, which are delivered to monitored computer system(s) 154 (e.g., servers) under the supervision and management of a computer monitoring hardware system such as computer 102.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
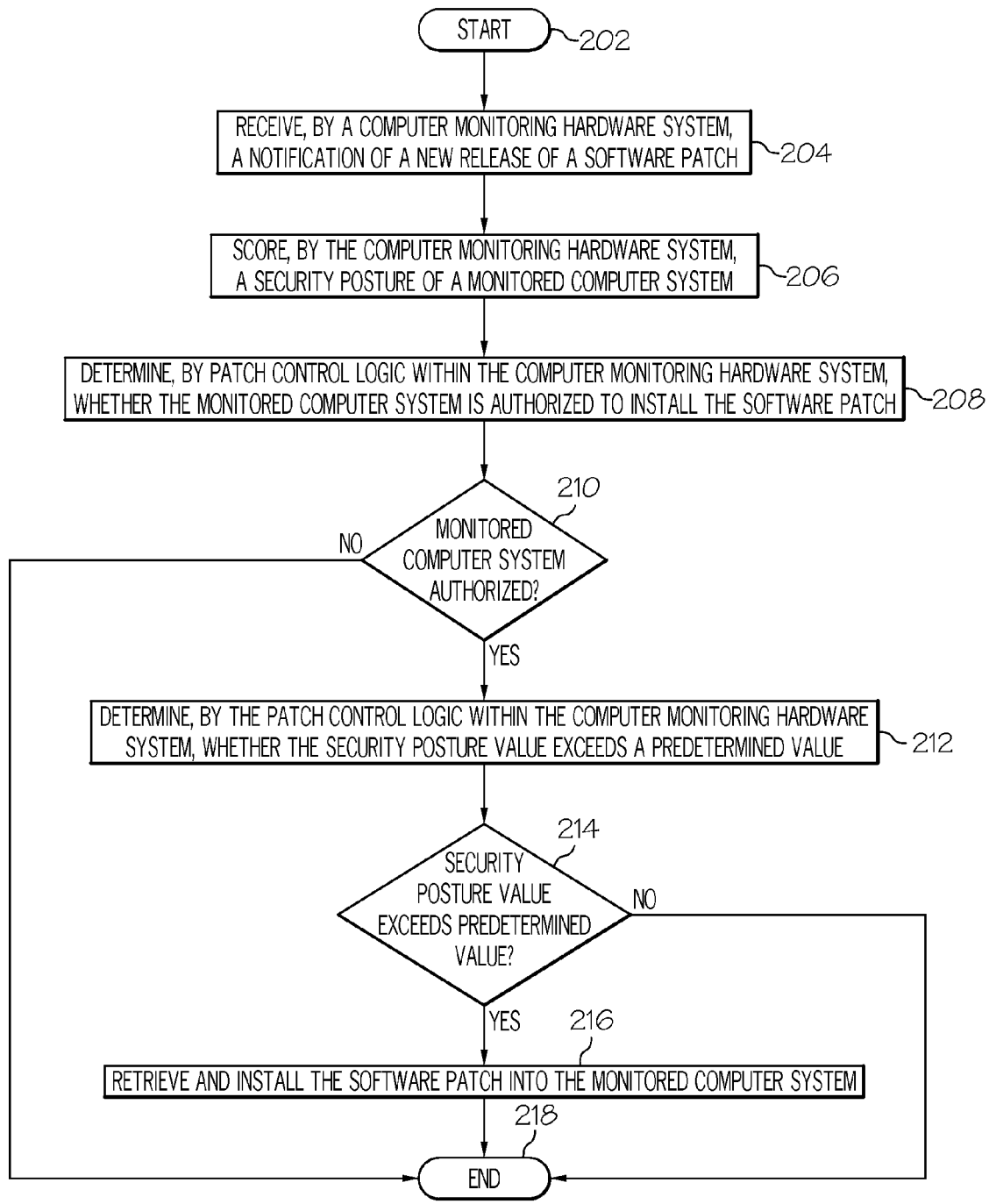
FIG. 2 is a high level flow chart of one or more exemplary steps performed by a processor or other computer hardware to manage the installation of new software patches in computer systems.

With reference now to FIG. 2, a high level flow chart of one or more exemplary steps performed by a processor or other computer hardware to manage the installation of new software patches in computer systems is presented. After initiator block 202, a computer monitoring hardware system (e.g., computer 102 shown in FIG. 1) receives a notification (e.g., from patch server 152 shown in FIG. 1) of a new release of a software patch, as described in block 204. As described in block 206, the computer monitoring hardware system scores a security posture of a monitored computer system. This scoring generates a security posture value based on a set of computer system parameters for the monitored computer system (e.g., one or more servers from monitored computer system(s) 154 shown in FIG. 1). In order to be processed by the computer monitoring hardware system, in one embodiment the set of computer system parameters is described by a set of binary data. Thus, the scoring is performed by the computer monitoring hardware system utilizing the set of binary data as inputs to a patch control logic (e.g., PCL 148 in FIG. 1) within the computer monitoring hardware system. In one embodiment, the set of computer system parameters comprises a past history of attacks on the monitored computer system. That is, determining the vulnerability of a particular system/server is based on when, how often, by what party, etc. the particular system/server was attacked by malicious software (e.g., viruses, Distributed Denial of Service (DDoS) attacks, etc.) in the past.

In one embodiment, the set of computer system parameters further comprises a predetermined level of exposure of the monitored computer system to other computer systems. For example, a computer that is behind a firewall is less exposed to other computer systems than a computer that is not behind a firewall. In this example, the computer system that is not behind the firewall would be given preference over the computer that is behind the firewall when scheduling the installation of the new software patch.

In one embodiment, the set of computer system parameters further comprises a predetermined level of integrity and trustworthiness of data stored on the monitored computer system. For example, a computer that holds data that has been verified as being accurate and/or truthful (e.g., facts, data, etc. have been verified/audited as being accurate) is deemed to have a higher level of integrity and trustworthiness than a computer that holds data that has not been formally audited/verified/certified (e.g., information in informal e-mails, local "scratch pads", etc.). In this example, the computer holding the verified/audited data would be given preference over the computer holding the unverified data when scheduling the installation of the new software patch.

In one embodiment, the set of computer system parameters further comprises an amount of time that the monitored computer system will be unavailable for use while the software patch is installed on the monitored computer system. For example, one computer may be down for 5 minutes while installing a new software patch, while another may be down for 5 days. That is, the first computer may be readily accessible, either by remote control or by being physically local, and thus installing the patch will take only a short amount of time. However, another computer may be physically located at a remote location that is not accessible by remote control (e.g., via the Internet). In order to prevent damage to this remote system, it may need to be taken offline (e.g., by telling someone to simply unplug it) until a technician is able to come out and install the new software patch. In this example, the computer requiring only 5 minutes to install the new software patch would be given preference over the computer that required 5 days to install the new software patch when scheduling the installation of the new software patch.

In one embodiment, the set of computer system parameters further comprises a quantity of steps required to access the monitored computer system. For example, a first computer may require just 1 step to access a particular server (e.g., log into a webpage that is dedicated to accessing that particular server). However, a second computer may require 5 steps in order to be accessed (e.g., 1) access a portal webpage; 2) enter CAPTCHA-type words to ensure that the user is not a malicious bot; 3) identify a particular server; 4) enter a first password; and 5) enter a second password). In this example, the first computer is likely to need the new software patch more than the second computer (particularly if the software patch is to prevent a viral attack), and thus the first computer is given preference over the second computer when scheduling the installation of the new software patch.

In one embodiment, the set of computer system parameters further comprises a quantity of remote databases that are accessible by the monitored computer system. For example, a first server may have access to only 1-2 local databases (due to internal configuration and/or security settings), while a second computer may have access to thousands of databases, either local or remote. In this example, the second computer would be given preference over the first computer when scheduling the installation of the new software patch.

Note that in one embodiment, if there are multiple parameters in the set of computer system parameters, then one or more of the parameters within the set of computer system parameters is individually weighted to generate a weighted security posture value. That is, each parameter is weighted according to a predetermined importance of said each parameter. For example, assume that the set of computer system parameters includes a parameter related to the history of past attacks on a particular computer system, while another parameter is related to how many steps are required to access that computer system. In this example, it may have been predetermined that the history of past attacks is more important than how many steps are required to access this computer system. Thus, the first parameter (number of attacks) is given a weighting of 3, while the second parameter (number of steps required to access the system) is given a lower weighting of 1. That is, assume that there have been 5 attacks on a first computer system, and there are 3 steps that must be taken to access this first computer system. A second computer system, however, has only had 4 past attacks, but requires 4 steps to be accessed.

Thus, the weighted security posture value for the first computer system would be:

(3*5)(weighing of 3 times the 5 attacks)+(1*3) (weighting of 1 times the 3 steps)=18.

The weighted security posture value for the second computer system would be:

(3*4)(weighing of 3 times the 4 attacks)+(1*4)weighting of 1 times the 4 steps)=16.

Thus, the first computer system would have a higher weighted security posture value, and would be given preference over the second computer system when scheduling the installation of the new software patch, particularly if the new software patch is designed to reduce viral attacks. That is, the first computer is given priority over the second computer, even though the first computer initially might appear to be easier to hack, since it requires only 3 steps to access rather than the 4 steps required by the second computer.

Returning now to FIG. 2, the patch control logic within the computer monitoring hardware system determines whether the monitored computer system is authorized to install the software patch, as described in block 208. This authorization may be based on whether the particular computer system being monitored has the appropriate license to receive the software patch, whether that computer system is active and/or on-line, whether that computer system is geographically located within a country or other location that has been deemed to pose a national security risk (e.g., is that computer located in a country that is hostile to a local country), etc. If the monitored computer system is not authorized to install the software patch (query block 210), then the process ends (terminator block 218). However, if that computer system is authorized to install the software patch (query block 210), then a determination is made, by the patch control logic within the computer monitoring hardware system, as to whether the security posture value described above exceeds a predetermined value (block 212). For example, a predetermination may be made that only computer systems that have a weighted security posture value over 17 are to receive new software patches, in order to save money, reduce downtime of systems, etc. In the example above, the second computer system with the weighted security posture value of 16 would not get the new software patch, while the first computer system with the weighted security posture value of 18 would. Note that the decision to install the software patch can be based on the described-herein security posture value, weighted or not.

If the particular monitored computer system is authorized to install the new software patch and has a security posture value that exceeds the predetermined value (query block 214), then the new software patch is retrieved (e.g., by the computer 102 shown in FIG. 1 from the patch server 152) and is installed in the monitored computer system (e.g., monitored computer system(s) 154 shown in FIG. 1), as indicated in block 216.

Note that in one embodiment, the monitored computer system is assigned to a group of computer systems, in which each computer system in the group of computer systems has a same (or at least within a same range) scored security posture (based on the security posture value) as the monitored computer system. Thus, a predetermination can be made that, assuming that they are all authorized to receive the new software patch, each and every one of the computer systems in this group of computer systems will receive the same software patch for installation, thus avoiding the need to evaluate each of the computer systems in the group before software patch installation. That is, authorization to install the software patch for one of the computer systems in the group results in authorization to install the same software patch in all of the computer systems in the group. The computer systems may be grouped according to each of them using a same type of processor, a same or same type of operating system, etc. In another example, assume that the software patch is for a specific operating system, and that each computer system in a group of computer systems uses a same application program that runs under that specific operating system. In this example, all computers running this application program under this operating system will be granted authorization to install the software patch when one of the group is cleared (according to its scored security posture) to receive the software patch for installation.

In one embodiment, the software patch is classified as being part of a particular class of software patches. For example, assume that the notice of the new software patch received from the patch server states that this patch is for handling DDoS attacks. Assume further that an enterprise has a group of engineers who are assigned to work on DDoS attack prevention. In this example, the notification of new release of the software patch is transmitted only to this group of engineers. In one embodiment, the routing of the notification is controlled by the patch server. In another embodiment, however, the routing of the notification is controlled by the enterprise that owns/manages the monitored computer system. For example, all such software patch notifications may be received by an enterprise computer system that reads metadata describing the notification and the type of software patch involved. Using this metadata, the notification and/or the software patch itself is sent only to that group that is devoted to handling the type of problem addressed by this class of software patch.

In one embodiment, the particular class of software patches may be defined as patches designated for use in a specific hardware system that is running a particular application under a predetermined operating system. That is, rather than having a group that is devoted to handling a particular type of problem (e.g., DDoS attacks), the group can be made up of persons devoted to caretaking/managing a particularly type of system.

In one embodiment, notification of additional software patches for the computer system may be received (e.g., by computer 102 shown in FIG. 1). In this embodiment, a criticality level of the software patch is compared to a criticality level of the additional software patches. That is, each of these criticality levels has been predetermined according to how critical the software patch and the additional software patches are to enabling a target software to continue to function within predefined parameters. That is, the first software patch may have been predetermined to be highly critical (e.g., based on the security posture value described above), while the other software patches are deemed less important (based on these same security posture values). Thus, installation of the software patch and the additional software patches is prioritized based on the criticality level of the first software patch as compared to the criticality level of the additional software patches. In this embodiment, the criticality level may be further based on a predetermined level of exploitability of the computer system (e.g., a predetermined level of exploitability that is based on an amount of time (independent of the number of steps) required to access the computer system without authorization.

Note further that in one embodiment, information related to the software patch is stored in a configuration management database (CMDB), which holds information related to all of the monitored computer system(s) depicted in FIG. 1. This CMDB holds information from the patch server 152 as well as information from an owner/manager of the monitored computer system(s) 154, including requirements of the owner/manager as well as information related to the software patch. For example, the owner/manager of the monitored computer system may have a rule-based policy that no more than one software patch may be installed on any given monitored computer system every seven days.

Thus, when a software patch arrives at the computer 102 from the patch server 152, metadata describing that software patch is installed within the CMDB (depicted as CMDB 156 in FIG. 1), which may be within the computer 102 (e.g., as a component of PCL 148 or as independently stored as a database in hard drive 134) or it may be external to but accessible to computer 102. The metadata may describe the type of software patch (e.g., directed to combatting viruses); what software (operating system and/or application software) is upgraded by the software patch; the supplier of the software patch; and/or the recommended time frame (e.g., immediately upon receipt, at the next scheduled maintenance, within the next 24 hours, etc.) during which the software patch should be installed. The owner/manager of the monitored computer system, however, may have a policy/rule that states 1) no software patches are to be installed until the regularly scheduled maintenance of a system, unless 2) the "urgency level" of the software patch exceeds a predetermined level. For example, assume that the supplier of the software patch states, in the metadata accompanying the software patch, that the software patch has an urgency level of 3 (out of a scale of 1-5). Assume further that the owner/manager of the monitored computer system has established a rule that the owner/manager's policy of waiting to install software patches can only be overridden if the urgency level of the software patch is 4 or higher. In this example, the software patch would not be installed until normal maintenance. However, if the software patch had had an urgency level of 5, then it would be installed immediately. By containing information in the CMDB for both the software patch supplier (regarding the urgency of the software patch) and the owner/manager of the monitored computer system (regarding when/if rules related to installing software patches can be overruled), the monitoring entity (e.g., computer 102) is able to reconcile the requirements of both the software patch supplier and the owner/manager of the monitored computer system.

In one embodiment, the software patch is designed to repair a first software component in the monitored computer system. In this embodiment, a determination is made as to if and how the software patch would (inadvertently) affect the operation of a second software component in the monitored computer system. In response to determining that installing the software patch on the monitored computer system would cause the second software component to malfunction, then the software patch is uninstalled. Thus, in one embodiment, the first software component is an operating system and the second software component is an application program that may or may not be running under that operating system. In another example, the first software component is a first type of application program (e.g., a word processing program) and the second software component is a second type of application program (e.g., a graphics program). Nonetheless, the patch that was designed for the word processing system may have a detrimental effect on the graphics program.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer hardware-implemented method of managing software patches, the computer hardware-implemented method comprising:

receiving, by a computer monitoring hardware system, a notification of a new release of a software patch;

scoring, by the computer monitoring hardware system, a security posture of a monitored computer system, wherein said scoring generates a security posture value based on a set of computer system parameters for the monitored computer system, wherein the set of computer system parameters is described by a set of binary data, wherein the set of computer system parameters comprises a past history of attacks on the monitored computer system, and wherein said scoring is performed by the computer monitoring hardware system utilizing the set of binary data as inputs to a patch control logic within the computer monitoring hardware system;

determining, by the patch control logic within the computer monitoring hardware system, whether the monitored computer system is authorized to install the software patch;

determining, by the patch control logic within the computer monitoring hardware system, whether the security posture value exceeds a predetermined value;

in response to the patch control logic within the computer monitoring hardware system determining that the monitored computer system is authorized to install the software patch, and in response to the patch control logic within the computer monitoring hardware system determining that the security posture value exceeds the predetermined value, retrieving and installing the software patch into the monitored computer system;

determining, by the computer monitoring hardware system, a level of integrity and trustworthiness of data stored on a first computer system and a second computer system, wherein trusted data is deemed to have a high level of integrity and trustworthiness is determined to be accurate by a data audit, wherein accurate data correctly represent facts as ascertained by the data audit, and wherein untrusted data is deemed to have a low level of integrity and trustworthiness if coming from data that have not been formally audited; and scheduling, by the computer monitoring hardware system, installation of the software patch in a computer system that holds the trusted data before installing the software patch in a computer system that holds the untrusted data.

2. The computer hardware-implemented method of claim 1, wherein the set of computer system parameters further comprises a predetermined level of exposure of the monitored computer system to other computer systems, wherein the predetermined level of exposure is based on whether a computer system is behind a firewall, and wherein the computer hardware-implemented method further comprises:
   determining, by the computer monitoring hardware system, that the first computer system is behind the firewall;
   determining, by the computer monitoring hardware system, that the second computer system is not behind the firewall; and
   scheduling, by the computer monitoring hardware system, installation of the software patch on the first computer system that is behind the firewall before installing the software patch on the second computer system that is not behind the firewall.

3. The computer hardware-implemented method of claim 1, wherein the set of computer system parameters further comprises an amount of time that the monitored computer system will be unavailable for use while the software patch is being installed on the monitored computer system, wherein the first computer will be unavailable for use for a first length of time, wherein the second computer will be unavailable for use for a second length of time, wherein the first length of time is longer than the second length of time, and wherein the computer hardware-implemented method further comprises:
   scheduling, by the computer monitoring hardware system, installation of the software patch in the second computer before installing the software patch in the first computer.

4. The computer hardware-implemented method of claim 1, wherein the set of computer system parameters further comprises a quantity of steps required to access the monitored computer system, wherein the software patch is installed in a computer requiring more steps of a user to be accessed before being installed in a computer that requires relatively fewer steps of the user to be accessed.

5. The computer hardware-implemented method of claim 1, wherein the set of computer system parameters further comprises a quantity of remote databases that are accessible by the monitored computer system, wherein the first computer has access to a first quantity of remote databases, wherein the second computer has access to a second quantity of remote databases, wherein the first quantity is less than the second quantity, and wherein the computer hardware-implemented method further comprises:
   scheduling, by the computer monitoring hardware system, installation of the software patch in the second computer before installing the software patch in the first computer.

6. The computer hardware-implemented method of claim 1, wherein each parameter from the set of computer system parameters is individually weighted to generate a weighted security posture value, and wherein each parameter is weighted according to a predetermined importance of said each parameter.

7. The computer hardware-implemented method of claim 1, further comprising:
   assigning the monitored computer system to a group of computer systems, wherein each computer system in the group of computer systems has a same scored security posture as the monitored computer system; and
   installing the software patch in each computer system in the group of computer systems.

8. The computer hardware-implemented method of claim 7, wherein each computer system in the group of computer systems uses a same type of processor.

9. The computer hardware-implemented method of claim 7, wherein each computer system in the group of computer systems uses a same operating system.

10. The computer hardware-implemented method of claim 7, wherein the software patch is for a specific operating system, and wherein each computer system in the group of computer systems uses a same application program that runs under the specific operating system.

11. The computer hardware-implemented method of claim 1, further comprising:
    classifying the software patch as being part of a particular class of software patches; and
    transmitting the notification of the new release of the software patch only to a user group of persons that has been assigned to handle the particular class of software patches.

12. The computer hardware-implemented method of claim 11, wherein the particular class of software patches is defined as patches designated for use in a specific hardware system that is running a particular application under a predetermined operating system.

13. The computer hardware-implemented method of claim 1, further comprising:
    receiving notification of additional software patches for the monitored computer system;
    comparing a criticality level of the software patch to a criticality level of the additional software patches, wherein each said criticality level has been predetermined according to how critical the software patch and the additional software patches are to enabling a target software to continue to function within predefined parameters; and
    prioritizing installation of the software patch and the additional software patches based on the criticality level of the software patch as compared to the criticality level of the additional software patches.

14. The computer hardware-implemented method of claim 13, wherein the criticality level is further based on a predetermined level of exploitability of the monitored computer system, and wherein the predetermined level of exploitability is based on an amount of time required to access the monitored computer system without authorization.

15. The computer hardware-implemented method of claim 1, wherein the software patch is designed to repair a first software component, and wherein the computer hardware-implemented method further comprises:
    determining that the software patch affects an operation of a second software component; and
    in response to determining that installing the software patch on the monitored computer system causes the second software component to malfunction, uninstalling the software patch.

16. The computer hardware-implemented method of claim 15, wherein the first software component is an operating system and the second software component is an application program.

17. The computer hardware-implemented method of claim 15, wherein the first software component is a first type of application program and the second software component is a second type of application program.

18. A computer program product for managing software patches, wherein the computer program product comprises:
    a non-transitory computer readable storage media;

first program instructions receive a notification of a new release of a software patch;
second program instructions to score a security posture of a monitored computer system, wherein said scoring generates a security posture value based on a set of computer system parameters for the monitored computer system, and wherein the set of computer system parameters comprises a past history of attacks on the monitored computer system;
third program instructions to determine whether the monitored computer system is authorized to install the software patch;
fourth program instructions to determine whether the security posture value exceeds a predetermined value;
fifth program instructions to, in response to determining that the monitored computer system is authorized to install the software patch, and in response to determining that the security posture value exceeds the predetermined value, retrieve and install the software patch into the monitored computer system;
sixth program instructions to determine a level of integrity and trustworthiness of data stored on a first computer system and a second computer system, wherein trusted data is deemed to have a high level of integrity and trustworthiness if determined to be accurate by a data audit, and wherein untrusted data is deemed to have a low level of integrity and trustworthiness if coming from data that have not been formally audited; and
seventh program instructions to schedule installation of the software patch in a computer system that holds the trusted data before installing the software patch in a computer system that holds the untrusted data; and wherein the first, second, third, fourth, fifth, sixth, and seventh program instructions are stored on the non-transitory computer readable storage media.

19. A system comprising:
a processor, a computer readable memory, and a non-transitory computer readable storage media;
first program instructions to receive a notification of a new release of a software patch;
second program instructions to score a security posture of a monitored computer system, wherein said scoring generates a security posture value based on a set of computer system parameters for the monitored computer system, and wherein the set of computer system parameters comprises a past history of attacks on the monitored computer system;
third program instructions to determine whether the monitored computer system is authorized to install the software patch;
fourth program instructions to determine whether the security posture value exceeds a predetermined value;
fifth program instructions to, in response to determining that the monitored computer system is authorized to install the software patch, and in response to determining that the security posture value exceeds the predetermined value, retrieve and install the software patch into the monitored computer system;
sixth program instructions to determine a level of integrity and trustworthiness of data stored on a first computer system and a second computer system, wherein trusted data is deemed to have a high level of integrity and trustworthiness if determined to be accurate by a data audit, and wherein untrusted data is deemed to have a low level of integrity and trustworthiness if coming from data that have not been formally audited; and
seventh program instructions to schedule installation of the software patch in a computer system that holds the trusted data before installing the software patch in a computer system that holds the untrusted data; and wherein the first, second, third, fourth, fifth, sixth, and seventh program instructions are stored on the non-transitory computer readable storage media for execution by the processor via the computer readable memory.

\* \* \* \* \*